(12) United States Patent  
Cohen et al.

(10) Patent No.: US 7,437,387 B2
(45) Date of Patent: Oct. 14, 2008

(54) METHOD AND SYSTEM FOR PROVIDING A FILE SYSTEM OVERLAY

(75) Inventors: Gavin David Cohen, Dublin, CA (US); Don Alvin Trimmer, Livermore, CA (US); Rico Blaser, San Francisco, CA (US)

(73) Assignee: Netapp, Inc., Sunnyvale, CA (US)

( * ) Notice: Subject to any disclaimer, the term of this patent is extended or adjusted under 35 U.S.C. 154(b) by 534 days.

(21) Appl. No.: 10/231,674

(22) Filed: Aug. 30, 2002

(65) Prior Publication Data

US 2004/0044706 A1   Mar. 4, 2004

(51) Int. Cl.
 *G06F 12/00* (2006.01)
(52) U.S. Cl. .................... 707/204; 707/200; 707/201; 707/203; 707/10; 707/100; 707/1; 711/162; 711/6; 711/112; 703/24
(58) Field of Classification Search ............... 707/200, 707/201, 203, 204, 10, 100, 1; 711/162, 711/6, 112; 703/24
See application file for complete search history.

(56) References Cited

U.S. PATENT DOCUMENTS

| 4,635,145 | A |   | 1/1987  | Horie et al. |
| 4,727,512 | A |   | 2/1988  | Birkner et al. |
| 4,775,969 | A |   | 10/1988 | Osterlund |
| 5,297,124 | A |   | 3/1994  | Plotkin et al. |
| 5,438,674 | A |   | 8/1995  | Keele et al. |
| 5,455,926 | A |   | 10/1995 | Keele et al. |
| 5,579,516 | A | * | 11/1996 | Van Maren et al. ............ 707/1 |
| 5,666,538 | A |   | 9/1997  | DeNicola |
| 5,673,382 | A |   | 9/1997  | Cannon et al. |
| 5,745,748 | A | * | 4/1998  | Ahmad et al. ................. 707/10 |
| 5,774,292 | A |   | 6/1998  | Georgiou et al. |
| 5,774,643 | A |   | 6/1998  | Lubbers et al. |
| 5,774,715 | A |   | 6/1998  | Madany et al. |
| 5,805,864 | A |   | 9/1998  | Carlson et al. |
| 5,809,511 | A |   | 9/1998  | Peake |
| 5,809,543 | A |   | 9/1998  | Byers et al. |
| 5,854,720 | A |   | 12/1998 | Shrinkle et al. |
| 5,864,346 | A |   | 1/1999  | Yokoi et al. |
| 5,872,669 | A |   | 2/1999  | Morehouse et al. |

(Continued)

FOREIGN PATENT DOCUMENTS

EP   1333379   4/2006

(Continued)

OTHER PUBLICATIONS

"Alacritus Software's Securitus I: Pointing the Way to Virtual Tape Libraries" Aberdeen Group, Inc., Mar. 2002.

(Continued)

*Primary Examiner*—Charles Rones
*Assistant Examiner*—Michele C Choi
(74) *Attorney, Agent, or Firm*—Perkins Coie LLP

(57) ABSTRACT

A method and system wherein a plurality of different file system views may be provided for the same data. Data copied in a sequential format to a disk based repository using a data protection application is decoded so that the data may be presented and accessed using a standard file system view. The standard file system may be used to randomly access the data as desired.

8 Claims, 3 Drawing Sheets

U.S. PATENT DOCUMENTS

| | | | |
|---|---|---|---|
| 5,875,479 A | 2/1999 | Blount et al. | |
| 5,911,779 A | 6/1999 | Stallmo et al. | |
| 5,949,970 A | 9/1999 | Sipple et al. | |
| 5,961,613 A | 10/1999 | DeNicola | |
| 5,963,971 A | 10/1999 | Fosler et al. | |
| 5,974,424 A | 10/1999 | Schmuck et al. | |
| 6,021,408 A | 2/2000 | Ledain et al. | |
| 6,023,709 A | 2/2000 | Anglin et al. | |
| 6,029,179 A | 2/2000 | Kishi | |
| 6,041,329 A | 3/2000 | Kishi | |
| 6,044,442 A | 3/2000 | Jesionowski | |
| 6,049,848 A | 4/2000 | Yates et al. | |
| 6,061,309 A | 5/2000 | Gallo et al. | |
| 6,067,587 A | 5/2000 | Miller et al. | |
| 6,070,224 A | 5/2000 | LeCrone et al. | |
| 6,098,148 A | 8/2000 | Carlson | |
| 6,128,698 A | 10/2000 | Georgis | |
| 6,131,142 A | 10/2000 | Kamo et al. | |
| 6,131,148 A | 10/2000 | West et al. | |
| 6,163,856 A | 12/2000 | Dion et al. | |
| 6,173,359 B1 | 1/2001 | Carlson et al. | |
| 6,195,730 B1 | 2/2001 | West | |
| 6,225,709 B1 | 5/2001 | Nakajima | |
| 6,247,096 B1 | 6/2001 | Fisher et al. | |
| 6,260,110 B1 | 7/2001 | LeCrone et al. | |
| 6,266,784 B1 | 7/2001 | Hsiao et al. | |
| 6,269,423 B1 | 7/2001 | Kishi | |
| 6,269,431 B1 * | 7/2001 | Dunham | 711/162 |
| 6,282,609 B1 | 8/2001 | Carlson | |
| 6,289,425 B1 | 9/2001 | Blendermann et al. | |
| 6,292,889 B1 | 9/2001 | Fitzgerald et al. | |
| 6,301,677 B1 | 10/2001 | Squibb | |
| 6,304,880 B1 | 10/2001 | Kishi | |
| 6,304,882 B1 | 10/2001 | Strellis et al. | |
| 6,317,814 B1 | 11/2001 | Blendermann et al. | |
| 6,324,497 B1 | 11/2001 | Yates et al. | |
| 6,327,418 B1 | 12/2001 | Barton | |
| 6,336,163 B1 | 1/2002 | Brewer et al. | |
| 6,336,173 B1 | 1/2002 | Day et al. | |
| 6,339,778 B1 | 1/2002 | Kishi | |
| 6,341,329 B1 | 1/2002 | LeCrone et al. | |
| 6,343,342 B1 | 1/2002 | Carlson | |
| 6,353,837 B1 | 3/2002 | Blumenau | |
| 6,360,232 B1 | 3/2002 | Brewer et al. | |
| 6,385,706 B1 * | 5/2002 | Ofek et al. | 711/162 |
| 6,389,503 B1 | 5/2002 | Georgis et al. | |
| 6,408,359 B1 | 6/2002 | Ito et al. | |
| 6,487,561 B1 | 11/2002 | Ofek et al. | |
| 6,496,791 B1 | 12/2002 | Yates et al. | |
| 6,499,026 B1 | 12/2002 | Rivette et al. | |
| 6,546,384 B2 * | 4/2003 | Shaath et al. | 707/2 |
| 6,557,073 B1 | 4/2003 | Fujiwara | |
| 6,557,089 B1 | 4/2003 | Reed et al. | |
| 6,578,120 B1 | 6/2003 | Crockett et al. | |
| 6,615,365 B1 | 9/2003 | Jenevein et al. | |
| 6,625,704 B2 | 9/2003 | Winokur | |
| 6,654,912 B1 | 11/2003 | Viswanathan et al. | |
| 6,658,435 B1 | 12/2003 | McCall | |
| 6,694,447 B1 | 2/2004 | Leach et al. | |
| 6,725,331 B1 | 4/2004 | Kedem | |
| 6,766,520 B1 | 7/2004 | Rieschl et al. | |
| 6,779,057 B2 | 8/2004 | Masters et al. | |
| 6,779,058 B2 | 8/2004 | Kishi et al. | |
| 6,779,081 B2 | 8/2004 | Arakawa et al. | |
| 6,816,941 B1 | 11/2004 | Carlson et al. | |
| 6,816,942 B2 | 11/2004 | Okada et al. | |
| 6,834,324 B1 | 12/2004 | Wood | |
| 6,850,964 B1 | 2/2005 | Brough et al. | |
| 6,877,016 B1 | 4/2005 | Hart et al. | |
| 6,915,397 B2 | 7/2005 | Lubbers et al. | |
| 6,931,557 B2 | 8/2005 | Togawa | |
| 6,938,039 B1 * | 8/2005 | Bober et al. | 707/8 |
| 6,950,263 B2 | 9/2005 | Suzuki et al. | |
| 6,957,291 B2 | 10/2005 | Moon et al. | |
| 6,973,369 B2 | 12/2005 | Trimmer et al. | |
| 6,973,534 B2 | 12/2005 | Dawson | |
| 6,978,325 B2 | 12/2005 | Gibble | |
| 6,988,109 B2 * | 1/2006 | Stanley et al. | 707/103 Y |
| 7,032,126 B2 | 4/2006 | Zalewski et al. | |
| 7,032,131 B2 | 4/2006 | Lubbers et al. | |
| 7,055,009 B2 | 5/2006 | Factor et al. | |
| 7,072,910 B2 | 7/2006 | Kahn et al. | |
| 7,096,331 B1 | 8/2006 | Haase et al. | |
| 7,100,089 B1 | 8/2006 | Phelps | |
| 7,107,417 B2 | 9/2006 | Gibble et al. | |
| 7,111,136 B2 | 9/2006 | Yamagami | |
| 7,127,388 B2 | 10/2006 | Yates et al. | |
| 7,127,577 B2 | 10/2006 | Koning et al. | |
| 7,143,307 B1 | 11/2006 | Witte et al. | |
| 7,152,077 B2 | 12/2006 | Veitch et al. | |
| 7,155,586 B1 | 12/2006 | Wagner et al. | |
| 7,200,546 B1 | 4/2007 | Nourmohamadian et al. | |
| 2001/0047447 A1 | 11/2001 | Katsuda | |
| 2002/0004835 A1 | 1/2002 | Yarbrough | |
| 2002/0016827 A1 | 2/2002 | McCabe et al. | |
| 2002/0026595 A1 | 2/2002 | Saitou et al. | |
| 2002/0095557 A1 | 7/2002 | Constable et al. | |
| 2002/0133491 A1 | 9/2002 | Sim et al. | |
| 2002/0144057 A1 | 10/2002 | Li et al. | |
| 2002/0163760 A1 | 11/2002 | Lindsey et al. | |
| 2002/0166079 A1 | 11/2002 | Ulrich et al. | |
| 2002/0171546 A1 | 11/2002 | Evans et al. | |
| 2003/0004980 A1 | 1/2003 | Kishi et al. | |
| 2003/0037211 A1 | 2/2003 | Winokur | |
| 2003/0097462 A1 | 5/2003 | Parent et al. | |
| 2003/0120476 A1 | 6/2003 | Yates et al. | |
| 2003/0120676 A1 * | 6/2003 | Holavanahalli et al. | 707/102 |
| 2003/0126388 A1 | 7/2003 | Yamagami | |
| 2003/0135672 A1 | 7/2003 | Yip et al. | |
| 2003/0149700 A1 | 8/2003 | Bolt | |
| 2003/0182301 A1 | 9/2003 | Patterson et al. | |
| 2003/0182350 A1 | 9/2003 | Dewey | |
| 2003/0188208 A1 | 10/2003 | Fung | |
| 2003/0217077 A1 | 11/2003 | Schwartz et al. | |
| 2003/0225800 A1 | 12/2003 | Kavuri | |
| 2004/0015731 A1 | 1/2004 | Chu et al. | |
| 2004/0098244 A1 | 5/2004 | Dailey et al. | |
| 2004/0181388 A1 | 9/2004 | Yip et al. | |
| 2004/0181707 A1 | 9/2004 | Fujibayashi | |
| 2005/0010529 A1 | 1/2005 | Zalewski et al. | |
| 2005/0044162 A1 | 2/2005 | Liang et al. | |
| 2005/0063374 A1 | 3/2005 | Rowan et al. | |
| 2005/0065962 A1 | 3/2005 | Rowan et al. | |
| 2005/0066118 A1 | 3/2005 | Perry et al. | |
| 2005/0066222 A1 | 3/2005 | Rowan et al. | |
| 2005/0066225 A1 | 3/2005 | Rowan et al. | |
| 2005/0076070 A1 | 4/2005 | Mikami | |
| 2005/0076261 A1 | 4/2005 | Rowan et al. | |
| 2005/0076262 A1 | 4/2005 | Rowan et al. | |
| 2005/0076264 A1 | 4/2005 | Rowan et al. | |
| 2005/0144407 A1 | 6/2005 | Colgrove et al. | |
| 2006/0047895 A1 | 3/2006 | Rowan et al. | |
| 2006/0047902 A1 | 3/2006 | Passerini | |
| 2006/0047903 A1 | 3/2006 | Passerini | |
| 2006/0047905 A1 | 3/2006 | Matze et al. | |
| 2006/0047925 A1 | 3/2006 | Passerini | |
| 2006/0047989 A1 | 3/2006 | Delgado et al. | |
| 2006/0047998 A1 | 3/2006 | Darcy | |
| 2006/0047999 A1 | 3/2006 | Passerini et al. | |
| 2006/0143376 A1 | 6/2006 | Matze et al. | |

FOREIGN PATENT DOCUMENTS

| | | |
|---|---|---|
| WO | WO 99/03098 | 1/1999 |

| | | |
|---|---|---|
| WO | WO 99/06912 | 2/1999 |
| WO | WO2005/031576 | 4/2005 |
| WO | WO2006/023990 | 3/2006 |
| WO | WO2006/023991 | 3/2006 |
| WO | WO2006/023992 | 3/2006 |
| WO | WO2006/023993 | 3/2006 |
| WO | WO2006/023994 | 3/2006 |
| WO | WO2006/023995 | 3/2006 |

OTHER PUBLICATIONS

"Product Brief: Rhapsody/Alacritus-Secritus/XPath Virtual Tape in the Fabric" The Enterprise Storage Group, Aug. 2002.

"Alacritus Software Announces Securitus I, The Industry's First Virtual Tape Library Solution: Securitus I Heralds Advent of 'Disruptive Technology' that Serves as Replacement to Tape Libraries" Alacritus Software, Inc., Jun. 25, 2001.

"Alacritus, Hitachi CP and Nissho Team to Create Virtual Tape Library Appliance: Industry's First Virtual Tape Library Appliance to Replace Tape Libraries" Alacritus Software, Inc. Jun. 25, 2001.

"Hitachi CP, Nissho, and Alacritus Software Bring Virtual Tape Library Appliance Solution to Market: Three Companies Join to Deliver VTLA Smart Guard—A Disk Subsystem Product that Functions as a Virtual Storage Tape Library" Alactrius Software, Inc., Oct. 3, 2001.

Trimmer, Don, "Tape Free Backup/Recovery: Requirements and Advantages: Virtualization Technology Will Encompass Many Applications, One of the Most Significant Possibly Being Backup/Recovery" InfoStor, Mar. 2002.

"Alacritus Software Announces Virtual Tape Library for Legato NetWorker Data Protection Solution" Alacritus Software, Inc., Jan. 8, 2002.

"Alacritus Software Announces Securitus I, the Industry's First Virtual Tape Library Solution: Securitus I Heralds Advent of 'Disruptive Technology' that Serves as Replacement to Tape Libraries" Alacritus Software, Inc., Apr. 9, 2002.

Biggar, Heidi, "Disk and Tape Forge New Partnership in Backup Arena" InfoStor, Nov. 2001.

Preston, W. Curtis, "Surprise! Cheap Disks Cure Slow Backup" Storage Magazine, Jun. 1, 2002.

"Alacritus, Hitachi CP and Nissho Team to Create Virtual Library" Jun. 25, 2001.

"Alacritus Software and Rhapsody Networks to Develop Breakthrough Backup Solutions for Storage Networks: Companies to Provide First Network-Intelligent Virtual Tape Solution Resulting in Dramatic ROI, Increases in Data Backup performance and Scalability" Alacritus Software, Jul. 8, 2002.

Camphuisen, Alicia, "Hitachi Inks OEM Deal with Legato" Jul. 17, 2002.

"Alacritus Announces Disk-Based Successor to Tape" Aug. 21, 2002.

Biggar, Heidi, "Alacritus Enables Disk-Based Backup" InfoStor, Sep. 2001.

"Securitus I White Paper: Disk Based Data Protection for Alacritus Software" Alacritus Software, Inc., Jul. 2001.

"Alacritus Software FAQs" Alacritus Software, Inc., Jul. 2001.

"Disk-Based Data Protection" Alacritus Software, Inc., Jul. 2001.

"Virtual Tape Library Technology Brochure" Alacritus Software, Inc., Jul. 2001.

"Disk-Based Data Protection" Alacritus Software, Inc. Sep. 2001.

* cited by examiner

METHOD AND SYSTEM FOR PROVIDING A FILE SYSTEM OVERLAY

BACKGROUND

The present invention relates to the presentation of data and more particularly to providing a plurality of different file system views for the same data.

Data protection (which includes backing up computer data, restoring computer data, securing computer data, and managing computer data storage) and disaster recovery procedures are essential processes in organizations that use computers. In fact, data protection is the single most expensive storage administrative task. Most large organizations perform data backups to tape media and use a robotically controlled tape library (or tape jukebox) to assist with backup automation. Performing and managing backups and restores involves many functions including, for example, media management (including tape tracking, rotation and off-site storage), tape jukebox management, file tracking, backup scheduling, assisted or automated data restore, and data archival.

In order to effectively perform the above functions, a sophisticated data protection application (DPA) is required. Examples of such DPAs include, for example, Legato NetWorker, Veritas BackupExec and CA ArcServe. DPAs automate and assist with the essential functions of data protection. DPAs are designed specifically to work with physical tape media, tape drives and tape libraries. Most of the complexity in DPAs relates to their interaction with physical tape.

Most DPAs implement sophisticated tape packing when performing backup of data. The function of a DPA is to efficiently collect data from the system that is being backed up and then to effectively store this data on tape. DPAs, therefore, implement their own proprietary tape formats to best suit their functionality.

Restoring data backed-up on tape is an operation that is also performed via the DPA. The DPA typically presents an interface that allows a user to select the file(s) required to be retrieved and facilitates the process of restoration. Physical tapes can only be sequentially accessed and are relatively slow compared to magnetic disks. This means that there is usually a significant time penalty (several minutes) when a file is restored. The restore process is cumbersome and requires that a user learn the operation of the DPA. Restore operations can typically only be performed by a small number of system administrators at a site who have been trained on the DPA's operation.

Furthermore, the data that is stored on physical tapes is considered off-line storage. In order to access the data, it is necessary for the DPA to read the files from the tape and then create appropriate files in a disk-based file system and write the contents of the files to the disk. This indirect restore process is necessary since the seek times for tape are extremely slow compared to disk (minutes instead of milliseconds). Although it would be easier for a user to access data on tape in the same way as data on disk, this would require random access patterns to tape. Tapes, however, are sequential devices making their performance extremely limited when randomly accessed.

It would therefore be desirable for data written in a sequential format by a particular DPA to be randomly accessible with standard file system semantics at disk-like speed.

SUMMARY

The current invention is a method and system wherein a plurality of different file system views may be provided for the same data regardless of the manner in which the data was stored. Data stored in sequential format may be accessed randomly at disk-like speed with standard file system semantics.

BRIEF DESCRIPTION OF THE DRAWING(S)

DETAILED DESCRIPTION OF THE PREFERRED EMBODIMENT(S)

Figure 1:
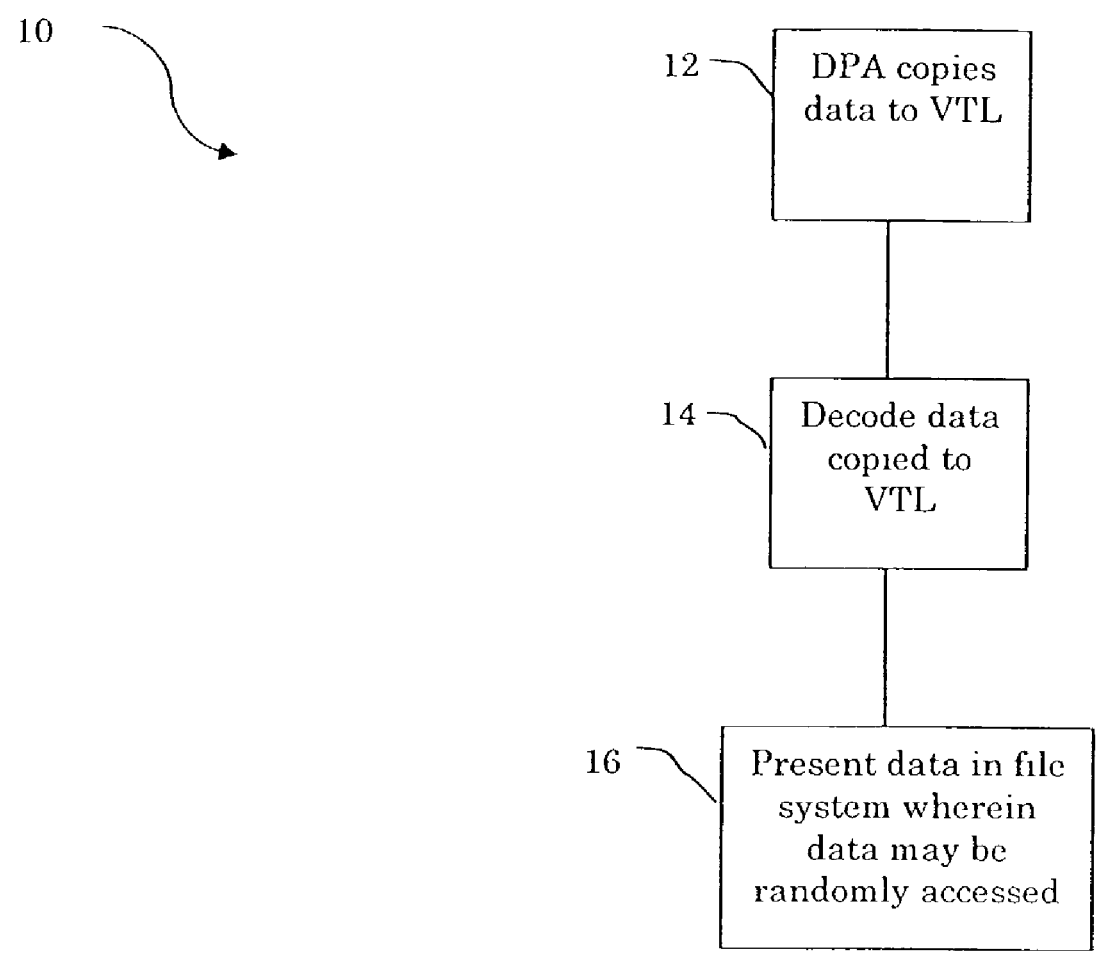
FIG. 1 is a method for providing a file system overlay for data stored in sequential format so that the data may be accessed randomly at disk-like speed with standard file system semantics in accordance with the preferred embodiment of the present invention.

Referring initially to FIG. 1, there is shown a method for providing a file system overlay. The overlay enables data stored in sequential format to be randomly accessed at disk-like speed using a standard file system. For example, when data is copied using the interface of one file system, that same data may be accessed using the interface of different file system. A preferred embodiment of the invention is to construct a standard file system view of data copied in a sequential format by a DPA. Typical standard file system views include Unix File System (UFS), Windows NT (NTFS), Veritas Files System (VxFS) as well as the network versions thereof (CIFS, NFS, etc.). The data copied by the DPA may be copied to a physical tape, but is preferably copied to a disk based repository such as a virtual tape library (VTL). The DPA does not distinguish between copying to a physical tape or copying to a VTL and data copied to the VTL by the DPA is copied in the same format as if the DPA was copying to a physical tape.

As mentioned, the VTL is a disk based repository for backup data. The VTL is a logical representation of a physical tape library (PTL). It exhibits all the behaviors of a PTL—it appears to have a robotic arm, one or more tape drives, tape cartridge slots, mailbox (entry/exit) slots and a bar code reader. It can respond on the bus (Small Computer System Interface or Fibre Channel, for example) in exactly the same way as a PTL. Furthermore, the characteristics of a VTL are defined by virtual library types. A VTL type defines how many tape drives and tape slots the library should have, as well as how the library should identify itself when probed on the bus.

Similar to the VTL, a virtual tape is a logical representation of a physical tape. An unlimited number of virtual tapes may be used inside a VTL and are written to by virtual tape drives in the same way as physical tapes. When a virtual tape is created, a tape label is associated with it. This label is used to identify a particular virtual tape which in turn comprises particular virtual tape files. Tape labels in a VTL are reported to the DPA in exactly the same way as tape barcode labels are reported by a PTL. Regardless of whether a VTL, PTL or both are used, it is still essential to have an offsite copy of the backup data. However, copying the contents of a VTL does not require a DPA and is much easier and more flexible. Furthermore, the disk based VTL is more reliable than tape media and a PTL.

When copying the data to the VTL, the DPA writes the data to the VTL in exactly the same format as if the DPA was writing the data to tape. While the DPA is writing data to the VTL, a log is kept of all the write operations made by the DPA to the VTL. Maintaining the log of write operations allows the particular sequence in which the data was copied to the onsite VTL to be played back in the same way it was received from the DPA. This allows additional physical tapes that are equivalent to physical tapes created using a DPA to be conveniently created, if necessary, without using the DPA. This also means, however, that the data copied to the VTL is still in a sequential format and cannot be randomly accessed using the DPA.

To randomly access the data which was copied to the VTL in sequential format, the data is decoded and presented in a standard file system. This allows users using a standard file system to directly access the individual files which were collectively copied to the VTL as part of the sequential copy written by the DPA.

As shown in FIG. 1, the method 10 begins with the step of copying data to a VTL (step 12). The data is copied to the VTL using a DPA as explained above. The data may be a backup data set which is typically copied to the VTL in the form of a small number of large files. The DPA copies the files to the VTL in sequential format. DPAs typically vary in the exact manner in which they copy sequential data, so the exact format in which the data is written will vary as a function of the DPA being used. In step 14, however, decoders are used to decode the sequential data so that the data may be randomly accessed using a standard file system. The sequential data is decoded while taking into account the particular manner in which the DPA copied the data to the VTL as well as the particular file system chosen for presenting that data.

Once the data, as contained in the VTL is decoded, that same data is presented in a standard file system view where the data may be accessed randomly at disk like speed (step 16). As mentioned above, the file system may be any standard file system such as, for example, Windows NT. This eliminates the requirement that data copied by a DPA be copied as a large file comprising a plurality of smaller files wherein the entire large file must be probed by the DPA when attempting to restore even a single file contained within the large file. In contrast, the present invention allows each individual file to be individually presented and accessed using a standard file system and without using the DPA.

Figure 2:
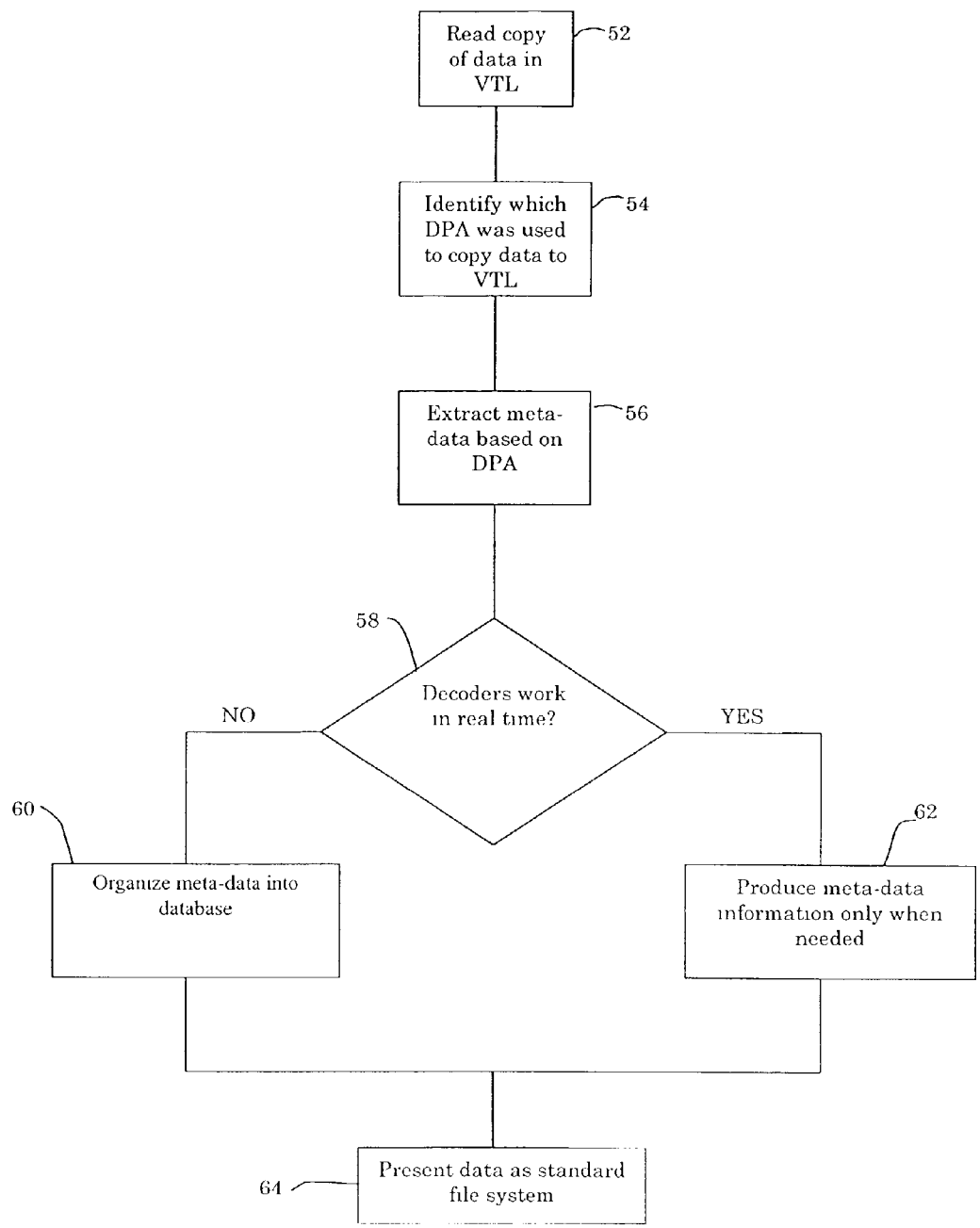
FIG. 2 is a method for decoding data copied in sequential format to a disk based repository in accordance with the preferred embodiment of the present invention.

The preferred method for decoding data (step 14, FIG. 1) so that data copied in sequential format to a VTL may be randomly accessed is shown in FIG. 2. To begin, the copy of the data copied to the VTL is read (step 52) in order to identify the DPA that was used to copy the data to the VTL (step 54). Based on the type of DPA, meta-data is extracted from the copy of the data in the VTL (step 56). The meta-data, by way of example, may include file names, directory names, hierarchical structure, file permissions, file size, creation, modification and access dates, and locations of virtual tape library blocks containing the file data.

Two alternatives exist for the meta-data extracted in step 56, it may be provided in real time as needed or may be organized into a database. In step 58, the method determines whether to provide the meta-data in real time. If so, the decoders will work in real time to produce the meta-data information only when needed (step 62). If not, the meta-data is organized into a database that is stored in the VTL (step 60). This database can store the meta-data for an unlimited number of backup instances and is similar in structure to file catalogs used by DPAs.

Regardless of whether the meta-data is provided in real time or organized in a data base, the meta-data is used in step 64 to present the data which was originally copied sequentially to the VTL in a standard file system view. Specifically, a file system layer is implemented and the data is presented as a standard read-only file system.

So as to provide an example of how the method may be implemented, assume a user performs a backup of the following files using a DPA:

/home/data/file1
/home/data/file2
/home/data/file3
/home/data/dir1/file1
/home/data/dir1/file2
/home/data/dir1/dir2/file1
/home/data/dir2/file1
/home/data/dir2/file2.

All of those files are copied as one big file, say file "home," by a DPA to a VTL. By way of background, if a user wants to restore a file, without the file system overlay of the present invention, he needs to start the DPA and, using the DPA's graphical user interface (GUI), probe the entire "home" file until the file that is required to perform the restore is located. Once located, the user must perform the restore via the GUI's restore interface to a specified location.

In contrast, providing a file system overlay in accordance with the present invention allows a user to simply mount or view the entire "home" file as a file system wherein all of the individual files which make up the "home" file may be presented and accessed directly without using the DPA. As such, all of the individual files that make up the "home" file may be presented as though they are on disk, or possibly at a new location. Therefore, the copy may be represented as individual files such as:

/restore/home/data/file1
/restore/home/data/file2
/restore/home/data/file3
/restore/home/data/dir1/file1
/restore/home/data/dir1/file2
/restore/home/data/dir1/dir2/file1
/restore/home/data/dir2/file1
/restore/home/data/dir2/file2.

This allows a user to directly choose and open a particular file that previously would have had to be located within a larger file. The particular file or files that are required for a restore may simply be copied to the required destination location.

Additional embodiments of the invention may be used to simplify the process for searching for a particular instance of a file. For example, a user may specify a data range to the VTL and the VTL in turn may present a file system with all versions of the files required for a restore that cover the designated data range. The files may also be differentiated by means of a unique version extension. Any means of conveniently designating particular files within the VTL so that particular files may be searched more efficiently is well within the scope of the present invention.

Figure 3:
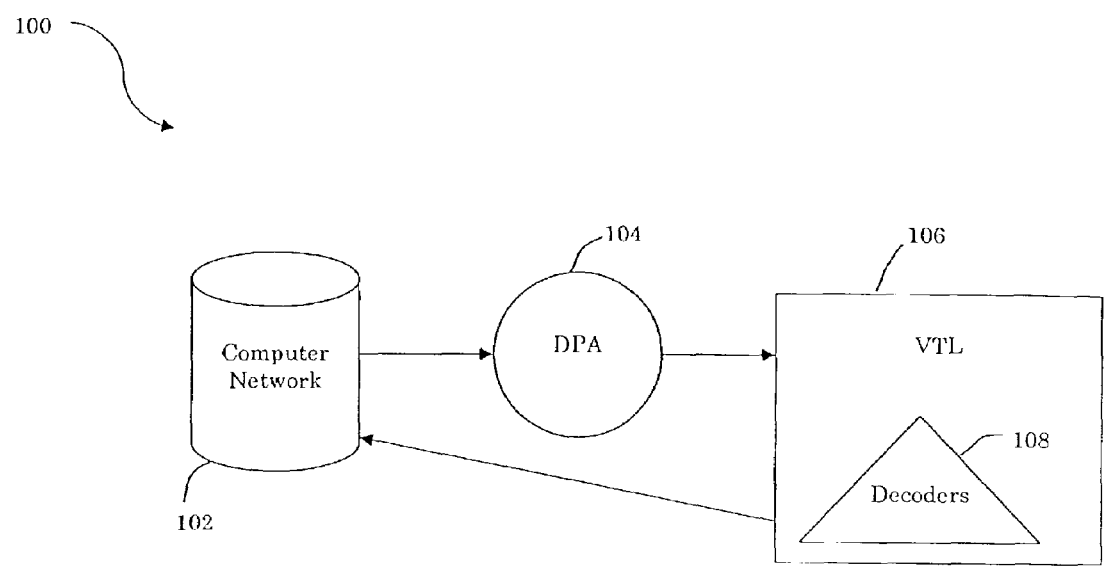
FIG. 3 is a system for providing a file system overlay for data stored in sequential format so that the data may be accessed randomly at disk-like speed with standard file system semantics in accordance with the preferred embodiment of the present invention.

Referring now to FIG. 3, there is shown a system 100 for providing a file system overlay so that data may be presented and accessed in more than one file system. In the system 100 shown, data generated by a computer network 102 is copied to a disk based repository which preferably is, as shown, a VTL 106 so as to provide a backup copy of the data. A DPA 104 is used to copy the data to the VTL 106 in the same format as if the DPA 104 were copying the data to a traditional PTL. A tape emulator (not shown) may be used to trick the DPA into thinking it is writing to a PTL.

Decoders 108 are also included to decode the data that was copied in sequential format by the DPA to the VTL, so that the data may be presented in a standard file system view. As noted above, the decoders may take into account the particular format used by both the DPA when copying data to a VTL and the file system in which the data will be presented for random access. Once the data has been decoded, it may be presented on the computer network 102 as a plurality of standard read only files which are individually viewable and accessible, to those with permission, using whatever standard file system is used by the computer network 102.

Although the present invention has been described in detail, it is to be understood that the invention is not limited thereto, and that various changes can be made therein without departing from the spirit and scope of the invention, which is defined by the attached claims.

What is claimed is:

1. A computer implemented method for providing a plurality of different file system views for same data, the method comprising the steps of:
   identifying a format used by a data protection application to copy data to a virtual tape library;
   selecting a decoder based on the identified format;
   processing the data using the selected decoder to extract meta-data from the virtual tape library; and
   implementing a file system overlay for the data using the extracted meta-data;
   presenting and randomly accessing the data stored in a sequential format using the file system overlay with a standard file system.

2. The method of claim 1 wherein the virtual tape library is a disk based repository for storing backup data in the same manner as a physical tape library.

3. The method of claim 1 wherein the step of processing the data further comprises:
   reading the data copied to the virtual tape library;
   identifying which type of data protection application was used to write the data;
   extracting meta-data based on the type of data protection application used to write the data; and
   reading the data from the virtual tape library in random access format.

4. A computer implemented method for providing a plurality of different file system views for same data, the method comprising the steps of:
   copying data in sequential format to a disk based repository using a data protection application;
   identifying which type of data protection application was used to copy the data;
   extracting meta-data based on the type of data protection application used to copy the data;
   decoding the data copied in sequential format to the disk based repository;
   presenting and accessing the data using a standard file system view, wherein the decoding is based on the type of data protection application used to copy the data to the disk based repository;
   reading the data copied to the disk based repository in random access format;
   and
   presenting the data in the standard file system view using a file system overlay wherein the data copied in a sequential format to the disk based repository is randomly accessed using a standard file system.

5. The method of claim 4 wherein the data copied to the disk based repository using the data protection application is copied as if the data protection application was copying the data to a physical tape library.

6. The method of claim 4 wherein the disk based repository is a virtual tape library for storing backup data in the same manner as a physical tape library.

7. A computer system for providing a plurality of different file system views for same data, the system comprising:
   a disk based repository;
   a data protection application configured to copy data in sequential format to the disk based repository;
   a decoder configured to decode the data copied in sequential format to the disk based repository, the decoder is selected from a plurality of decoders based on the type of data protection application used to copy the data to the disk based repository; and
   wherein data is presented using a file system overlay with a standard file system view to randomly access data copied in a sequential format to the disk based repository with a standard file system.

8. The system of claim 7 wherein the disk based repository is a virtual tape library configured to store backup data in the same manner as a physical tape library.

* * * * *